United States Patent
Kozu

(10) Patent No.: US 10,330,952 B2
(45) Date of Patent: Jun. 25, 2019

(54) SPECTACLE LENSES

(71) Applicant: HOYA CORPORATION, Tokyo (JP)

(72) Inventor: Kazuma Kozu, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/653,350

(22) PCT Filed: Nov. 28, 2013

(86) PCT No.: PCT/JP2013/082088
§ 371 (c)(1),
(2) Date: Jun. 18, 2015

(87) PCT Pub. No.: WO2014/097851
PCT Pub. Date: Jun. 26, 2014

(65) Prior Publication Data
US 2015/0346515 A1    Dec. 3, 2015

(30) Foreign Application Priority Data

Dec. 19, 2012 (JP) .................................. 2012-276543

(51) Int. Cl.
G02C 7/06    (2006.01)
G02C 7/02    (2006.01)

(52) U.S. Cl.
CPC ............. G02C 7/068 (2013.01); G02C 7/027 (2013.01); G02C 7/061 (2013.01); G02C 7/065 (2013.01)

(58) Field of Classification Search
CPC . G02C 7/02; G02C 7/06; G02C 7/063; G02C 7/065; G02C 7/7068; G02C 7/061; G02C 7/027; G02C 13/003; G06F 17/50

(Continued)

(56) References Cited

U.S. PATENT DOCUMENTS 5,777,716 A * 7/1998 Miura ...................... G02C 7/06
                                                    351/159.42
6,979,084 B2  12/2005 Qui
(Continued)

FOREIGN PATENT DOCUMENTS

CN    1815299 A    8/2006
CN    1831582 A    9/2006
(Continued)

OTHER PUBLICATIONS

Jun. 20, 2016 Office Action issued in Chinese Patent Application No. 201380066900.X.
(Continued)

Primary Examiner — Jie Lei
(74) Attorney, Agent, or Firm — Oliff PLC

(57) ABSTRACT

A pair of spectacle lenses includes: a first refractive portion; a second refractive portion whose refractive power is stronger than the first's; and a progressive power portion in which a refractive power changes progressively from the first to the second refractive portion, first refractive powers of a left and right of the lenses being different, progressive power portions lengths of the left and right of the lenses are different and changing rates of additions of the left and right of the lenses are different in accordance with a shift between left and right visual lines so that a difference between addition effects acting on the wearer's eyes is reduced when the left and right visual lines shift with respect to each other depending on the first refractive powers of the left and the right of the lenses being different where the wearer views an object through the lenses.

4 Claims, 11 Drawing Sheets

(58) Field of Classification Search
USPC ............ 351/159.75, 159.07, 159.08, 159.41, 351/159.42, 159.43, 159.46, 168, 169, 351/177
See application file for complete search history.

(56) References Cited

U.S. PATENT DOCUMENTS

| | | |
|---|---|---|
| 7,364,292 B2 | 4/2008 | Kato |
| 7,399,080 B2 | 7/2008 | Kitani et al. |
| 7,631,969 B2 | 12/2009 | Shinohara et al. |
| 8,162,478 B2 | 4/2012 | Kitani et al. |
| 9,010,932 B2 | 4/2015 | Shinohara et al. |
| 2003/0076479 A1 | 4/2003 | Qi |
| 2006/0176445 A1 | 8/2006 | Shinohara et al. |
| 2006/0203193 A1 | 9/2006 | Kato |
| 2007/0182923 A1 | 8/2007 | Kitani et al. |
| 2010/0271590 A1 | 10/2010 | Kitani et al. |
| 2010/0296052 A1 | 11/2010 | Esser et al. |
| 2011/0194070 A1 | 8/2011 | Wietschorke |
| 2011/0211159 A1 | 9/2011 | Suzuki |
| 2011/0273664 A1 | 11/2011 | Guilloux et al. |
| 2012/0218510 A1 | 8/2012 | Kato et al. |
| 2013/0148078 A1 | 6/2013 | Berthezene et al. |
| 2014/0055742 A1 | 2/2014 | Shinohara et al. |

FOREIGN PATENT DOCUMENTS

| | | |
|---|---|---|
| CN | 1906523 A | 1/2007 |
| CN | 102193210 A | 9/2011 |
| DE | 102006030204 A1 | 1/2008 |
| EP | 2 224 276 A1 | 9/2010 |
| EP | 2 395 386 A1 | 12/2011 |
| EP | 2 490 065 A1 | 8/2012 |
| EP | 2 937 729 A1 | 10/2015 |
| JP | H06-138422 A | 5/1994 |
| JP | 2006-350381 A | 12/2006 |
| JP | 2011-203705 A | 10/2011 |
| JP | 2012-173594 A | 9/2012 |
| JP | 2012-173596 A | 9/2012 |
| JP | 2012-173674 A | 9/2012 |
| JP | 2012-215639 A | 11/2012 |
| JP | 2013-171134 A | 9/2013 |
| JP | 2014-71420 A | 4/2014 |
| KR | 2003-0022047 A | 3/2003 |
| KR | 10-1194488 B1 | 10/2012 |
| WO | 2009/072528 A1 | 6/2009 |
| WO | 2012/115258 A1 | 8/2012 |
| WO | 2018/220737 A1 | 12/2018 |

OTHER PUBLICATIONS

Jul. 19, 2016 Office Action issued in Chinese Patent Application No. 201380066985.1.
Aug. 31, 2016 Office Action issued in Korean Patent Application No. 10-2015-7017470.
Aug. 29, 2016 Office Action issued in Korean Patent Application No. 10-2015-7017638.
Aug. 29, 2016 Office Action issued in Korean Patent Application No. 10-2015-7017871.
Aug. 29, 2016 Office Action issued in Korean Patent Application No. 10-2015-7017639.
Sep. 14, 2016 Office Action issued in U.S. Appl. No. 14/653,609.
Nov. 3, 2016 Office Action Issued in U.S. Appl. No. 14/653,368.
Feb. 4, 2014 Search Report issued in International Application No. PCT/JP2013/082088.
Feb. 4, 2014 International Search Report issued in International Patent Application No. PCT/JP2013/082089.
Feb. 4, 2014 International Search Report issued in International Patent Application No. PCT/JP2013/082090.
Feb. 4, 2014 International Search Report issued in International Application No. PCT/JP2013/082091.
Jun. 24, 2016 Extended European Search Report issued in European Patent Application No. 13864423.2.
Jul. 21, 2016 Extended European Search Report issued in European Patent Application No. 13864072.7.
Jun. 24, 2016 Extended European Search Report issued in European Patent Application No. 13866155.8.
Jun. 24, 2016 Extended European Search Report issued in European Patent Application No. 13865251.6.
U.S. Appl. No. 14/653,713, filed Jun. 18, 2015 in the name of Kazuma Kozu.
U.S. Appl. No. 14/653,368, filed Jun. 18, 2015 in the name of Kazuma Kozu.
U.S. Appl. No. 14/653,609, filed Jun. 18, 2015 in the name of Kazuma Kozu.
Jan. 9, 2017 Office Action Issued in U.S. Appl. No. 14/653,713.
Aug. 31, 2017 Office Action issued in U.S. Appl. No. 14/653,713.
May 19, 2017 Office Action Issued in U.S. Appl. No. 14/653,368.
Jun. 6, 2017 Office Action issued in U.S. Appl. No. 14/653,609.
Mar. 16, 2018 Examination Report issued in Austrailian Patent Application No. 2017201961.
Oct. 16, 2017 Office Action issued in U.S. Appl. No. 14/653,609.
Jun. 28, 2018 Office Action issued in U.S. Appl. No. 14/653,609.
Jan. 28, 2019 Office Action issued in U.S. Appl. No. 14/653,609.
Apr. 26, 2019 Examination Report issued in European Patent Application No. 13 864 423.2.

* cited by examiner

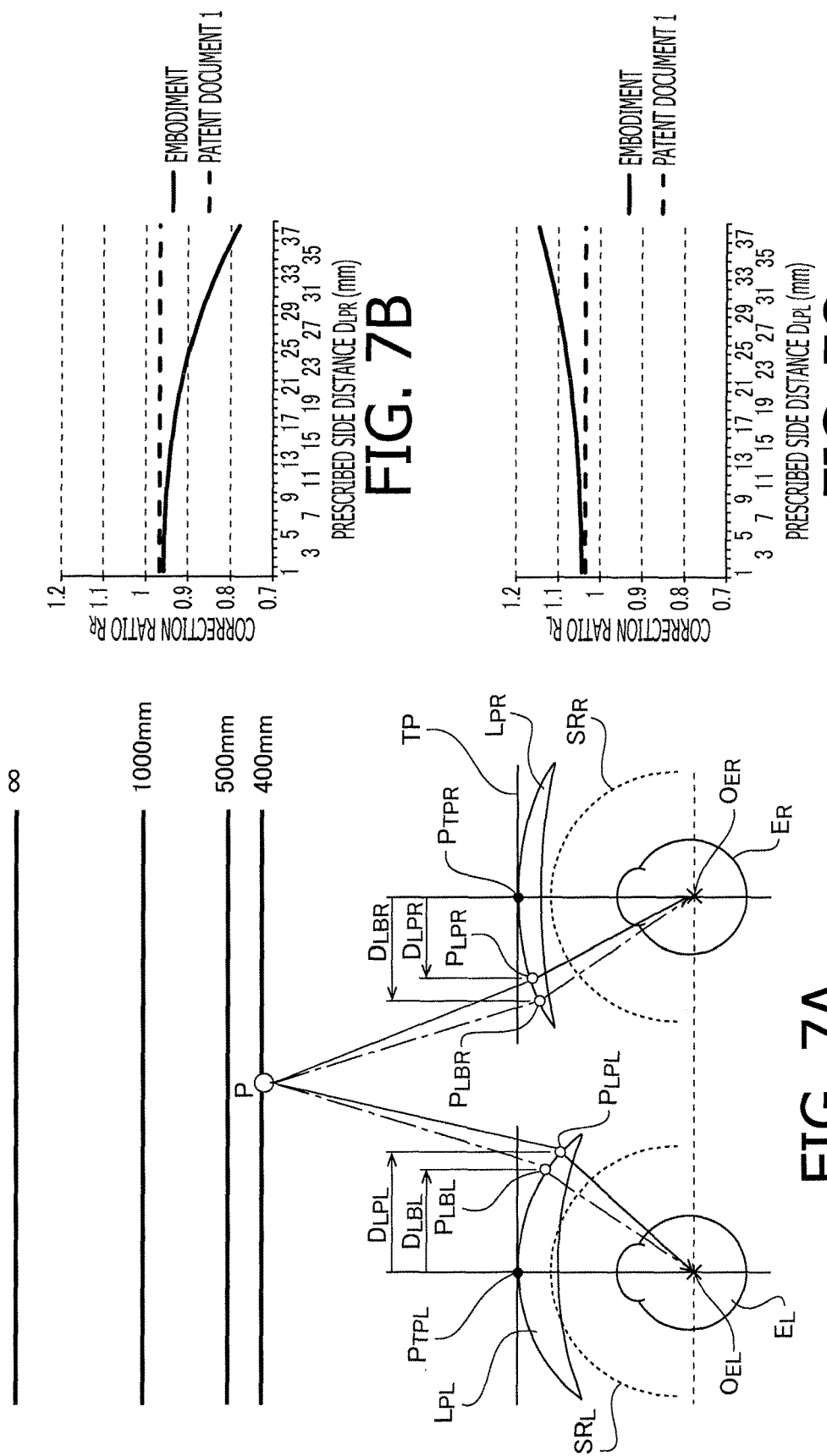

SPECTACLE LENSES

TECHNICAL FIELD

The present invention relates to a spectacle lens comprising a first refractive portion having a first refractive power, a second refractive portion having a second refractive power stronger than the first refractive portion, and a progressive power portion in which the refractive power changes progressively from the first refractive power portion to the second refractive power portion.

BACKGROUND ART

A spectacle lens having a refractive power portion in which the refractive power changes progressively is known. For example, a distance-near progressive power lens is designed such that the dioptric power changes progressively on a principal meridian so that a wearer can see an object clearly and seamlessly from a long distance to a short distance. Many of spectacle lenses of this type are designed depending on prescribed individual dioptric powers for left and right eyes and a wearing condition; however, for a case where a difference exists between prescribed distance dioptric powers for left and right eyes, such as anisometropia, conventional lens design was not suitable. The term anisometropia as used herein means a case where a difference exists between dioptric powers of left and right eyes regardless of the magnitude of the difference.

For example, when a wearer of anisometropia performs binocular vision for a target positioned on a side in a state where the wearer wears spectacle lenses of which left and right distance dioptric powers are different from each other, the wearer is forced to perform unnatural convergence or divergence not accompanied by tonic accommodation or relaxation of accommodation so as to cancel a shift between the left and right visual lines caused by a difference between prismatic effects of the left and right lenses. Furthermore, the convergence and the divergence of this type changes a position on a lens through which the visual line passes from a position assumed in design, which deteriorates the aberrations for the both eyes and thereby hampers suitable binocular vision.

In view of the above, regarding a pair of progressive power lenses having left and right dioptric powers different from each other, U.S. Pat. No. 8,162,478 (hereafter, referred to as patent document 1) suggests a pair of progressive power lenses configured to ensure suitable binocular vision. Specifically, patent document 1 describes technology where a lens component of a pair of progressive power lenses having left and right distance dioptric powers different from each other is divided into a component for a pair of progressive power lenses having the same distance dioptric power and the addition power and a component for a pair of single focal lenses having left and right dioptric powers different from each other, a ratio of moving amounts of visual lines on the lenses of the left and right eyes when an wearer moves the wearer's visual lines from a front far point to a far point other than the front while being oriented toward a predetermined azimuth angle in the state of performing binocular vision wearing the lenses having the component for the single focal lenses is calculated, and occurrence of aberrations other than the difference between the left and right distance dioptric powers is suppressed, in regard to the difference in the average dioptric power and the astigmatism between the left and right visual lines in binocular vision, by applying correction according to the ratio with respect to the average power distribution and the astigmatism of the lens component for a single eye or both eyes of the lenses having the component for the progressive power lens.

SUMMARY OF THE INVENTION

As described above, patent document 1 suggests the lenses ensuring suitable binocular vision by decreasing the difference in aberrations with respect to the left and right visual lines in regard to a pair of progressive power lenses having the left and right distance dioptric powers different from each other. However, a demand for ensuring suitable binocular vision at a higher level constantly exists. In view of the above, as a result of intensive studies, the inventor of the present invention has found spectacle lenses suitable for ensuring suitable binocular vision at a higher level.

According to an embodiment of the invention, there is provided a pair of spectacle lenses, each of the pair of spectacle lenses comprising: a first refractive portion having a first refractive power; a second refractive portion having a second refractive power stronger than the first refractive power; and a progressive power portion in which a refractive power changes progressively from the first refractive portion to the second refractive portion. First refractive powers of a left and a right of the pair of spectacle lenses are different from each other. Lengths of progressive power portions of the left and the right of the pair of spectacle lenses are different from each other and changing rates of additions of the left and the right of the pair of spectacle lenses are different from each other in accordance with a shift between left and right visual lines so that a difference between addition effects actually acting on left and right eyes of a wearer, on a principal meridian extending from the first refractive portion to the second refractive portion, is reduced when the left and right visual lines shift with respect to each other depending on a fact that the first refractive powers of the left and the right of the pair of spectacle lenses are different from each other in a state where the wearer views an object through the pair of spectacle lenses.

According to the spectacle lenses of the embodiment, since the difference between addition effects actually acing on left and right eyes of a wearer on the principal meridian from the first refractive portion to the second refractive portion can be reduced, degrees of accommodation required for left and right eyes can be maintained at the same level, for example. In this case, suitable binocular intermediate vision and near vision can be achieved. Furthermore, regarding the spectacle lenses of the embodiment of the invention, the difference between aberrations on the left and right visual lines is reduced, the quality of images formed on retinas of left and right eyes can be made equal to each other, and therefore a factor hampering the binocular vision function can be suppressed. As a result, suitable binocular vision can be guaranteed at every object distance from a long distance to a short distance, for example.

A length of the progressive power portion of one of the pair of spectacle lenses having the first refractive power weaker than that of an other of the pair of spectacle lenses may be shorter than a length of the progressive power portion of the other of the pair of spectacle lenses. A changing rate of an addition of the one of the pair of spectacle lenses having the first refractive power weaker than that of the other of the pair of spectacle lenses may be higher than a changing rate of an addition of the other of the pair of spectacle lenses.

One of the pair of spectacle lenses having the first refractive power weaker than that of an other of the pair of spectacle lenses may be configured such that a changing rate of an addition becomes higher as a point becomes closer to the second refractive portion from a design center defined by a predetermined hidden mark on the principal meridian, for example. The other of the pair of spectacle lenses having the first refractive power stronger than that of the one of the pair of spectacle lenses may be configured such that a changing rate of an addition becomes lower as a point becomes closer to the second refractive portion from the design center on the principal meridian, for example.

Widths of progressive power portions of the left and the right of the pair of spectacle lenses may be different from each other.

In every item of all items suitable for respective prescriptions in a spectacle lens item group, lengths of progressive power portions of a left and a right of the pair of spectacle lenses are different from each other, and changing rates of additions of the left and the right of the pair of spectacle lenses are different from each other.

According to the spectacle lenses of the embodiment of the invention, the difference between addition effects actually acing on left and right eyes of a wearer on the principal meridian from the first refractive portion to the second refractive portion can be reduced, and the difference between aberrations on the left and right visual lines is reduced. Therefore, suitable binocular vision can be guaranteed at every object distance from a long distance to a short distance, for example.

BRIEF DESCRIPTION OF THE DRAWINGS

FIG. 7 is an explanatory illustration for principally explaining a step S8 in FIG. 2, and illustrates a correction ratio.

EMBODIMENTS FOR CARRYING OUT THE INVENTION

In the following, a spectacle lens manufacturing system according to an embodiment of the invention is explained.

Spectacle Lens Manufacturing System 1

Figure 1:
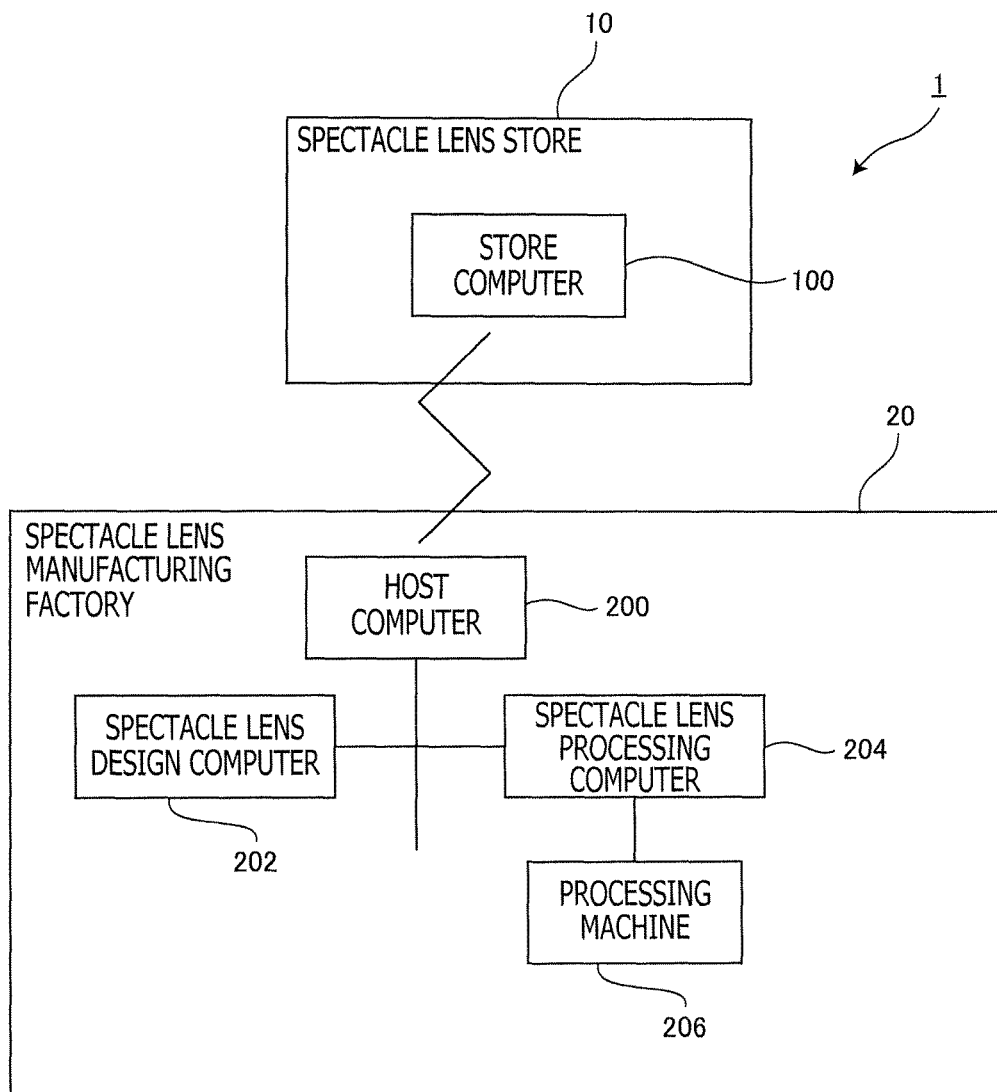
FIG. 1 is a block diagram illustrating a configuration of a spectacle lens manufacturing system according to an embodiment of the invention.

FIG. 1 is a block diagram illustrating a configuration of a spectacle lens manufacturing system 1 according to the embodiment. As shown in FIG. 1, the spectacle lens manufacturing system 1 includes an optical store 10 which orders spectacle lenses according to a prescription for a customer (a wearer), and a spectacle lens manufacturing factory 20 which manufactures spectacle lenses after receiving the order from the optical store 10. The order to the spectacle lens manufacturing factory 20 is issued through a predetermined network, such as the Internet, or data transmission by, for example, facsimile. Orderers may include ophthalmologists or general consumers.

Optical Store 10

In the optical store 10, a store computer 100 is installed. The store computer 100 is, for example, a general PC (Personal Computer), and software for ordering spectacle lenses to the spectacle lens manufacturing factory 20 has been installed in the store computer 100. To the store computer 100, lens data and frame data are input through an operation to a mouse or a keyboard by an optical store staff. The lens data includes, for example, a prescription (e.g., a base curve, spherical power, cylindrical power, a cylindrical axis direction, prismatic power, prism base setting, an addition power and PD (Pupillary Distance) and the like), a wearing condition of spectacle lenses (a vertex distance, a pantoscopic angle, a face form angle), the type of spectacle lens (a single-vision spherical lens, a single-vision aspherical lens, a multifocal lens (a bifocal lens or a progressive power lens)), coating (dyeing processing, hard coating, anti-reflection coating, ultraviolet light cutting and the like), and layout data according to a customer's request. The frame data includes shape data of a frame selected by a customer. The frame data is managed, for example, by barcode tags, and can be obtained by reading a barcode tag adhered to a frame by a barcode reader. The store computer 100 transmits the ordering data (the lens data and the frame data) to the spectacle lens manufacturing factory 20 via, for example, the Internet.

Spectacle Lens Manufacturing Factory 20

In the spectacle lens manufacturing factory 20, a LAN (Local Area Network) centering at a host computer 200 to which various terminal devices including a spectacle lens design computer 202 and a spectacle lens processing computer 204 are connected is constructed. Each of the spectacle lens design computer 202 and the spectacle lens processing computer 204 is a general PC. On the spectacle lens design computer 202 and the spectacle lens processing computer 204, a program for spectacle lens design and a program for spectacle lens processing are installed, respectively. To the host computer 200, the ordering data transmitted via the Internet is input from the store computer 100. The host computer 200 transmits the ordering data input thereto to the spectacle lens design computer 202.

In the spectacle lens manufacturing factory 20, design and processing for both surfaces, i.e., an outer surface and an inner surface, are performed for an unprocessed block piece so that a prescription for an wearer is satisfied. In order to enhance productivity, in the spectacle lens manufacturing factory 20, the whole production range of dioptric powers may be divided into a plurality of groups, and semi-finished lens blanks having outer surface (convex surface) curve shapes (a spherical shape or an aspherical shape) and lens diameters complying with respective production ranges may be prepared in advance in preparation for orders. In this case, in the spectacle lens manufacturing factory 20, spectacle lenses complying with the prescription for the wearer can be manufactured by only performing inner surface (concave surface) processing (and edging).

On the spectacle lens design computer 202, a program for designing spectacle lenses corresponding to an order has been installed, and generates lens design data based on the ordering data (lens data) and generates edge processing data based on the ordering data (frame data). Design of spectacle lenses by the spectacle lens design computer 202 is explained in detail later. The spectacle lens design computer 202 transfers generated lens design data and the edge processing data to the spectacle lens processing computer 204.

An operator sets a block piece on a processing machine 206, such as a curve generator, and inputs an instruction for start of processing to the spectacle lens processing computer 204. The spectacle lens processing computer 204 reads the lens design data and the edge processing data transferred from the spectacle lens design computer 202, and drives and controls the processing machine 206. The processing machine 206 performs grinding and polishing for inner and outer surfaces of the block piece in accordance with the lens design data, and generates the inner surface shape and the outer surface shape of the spectacle lens. Further, the processing machine 206 processes the outer peripheral surface of an uncut lens after generation of the inner surface shape and the outer surface shape so that the uncut lens has the peripheral shape corresponding to the edge shape.

In accordance with the ordering data, the spectacle lens after the edge processing is provided with various types of coatings, such as, dyeing processing, hard coating, anti-reflection coating and ultraviolet light cutting. The spectacle lenses are thus completed and are delivered to the optical store 10.

Specific Design Method of Spectacle Lens by Spectacle Lens Design Computer 202

Figure 2:
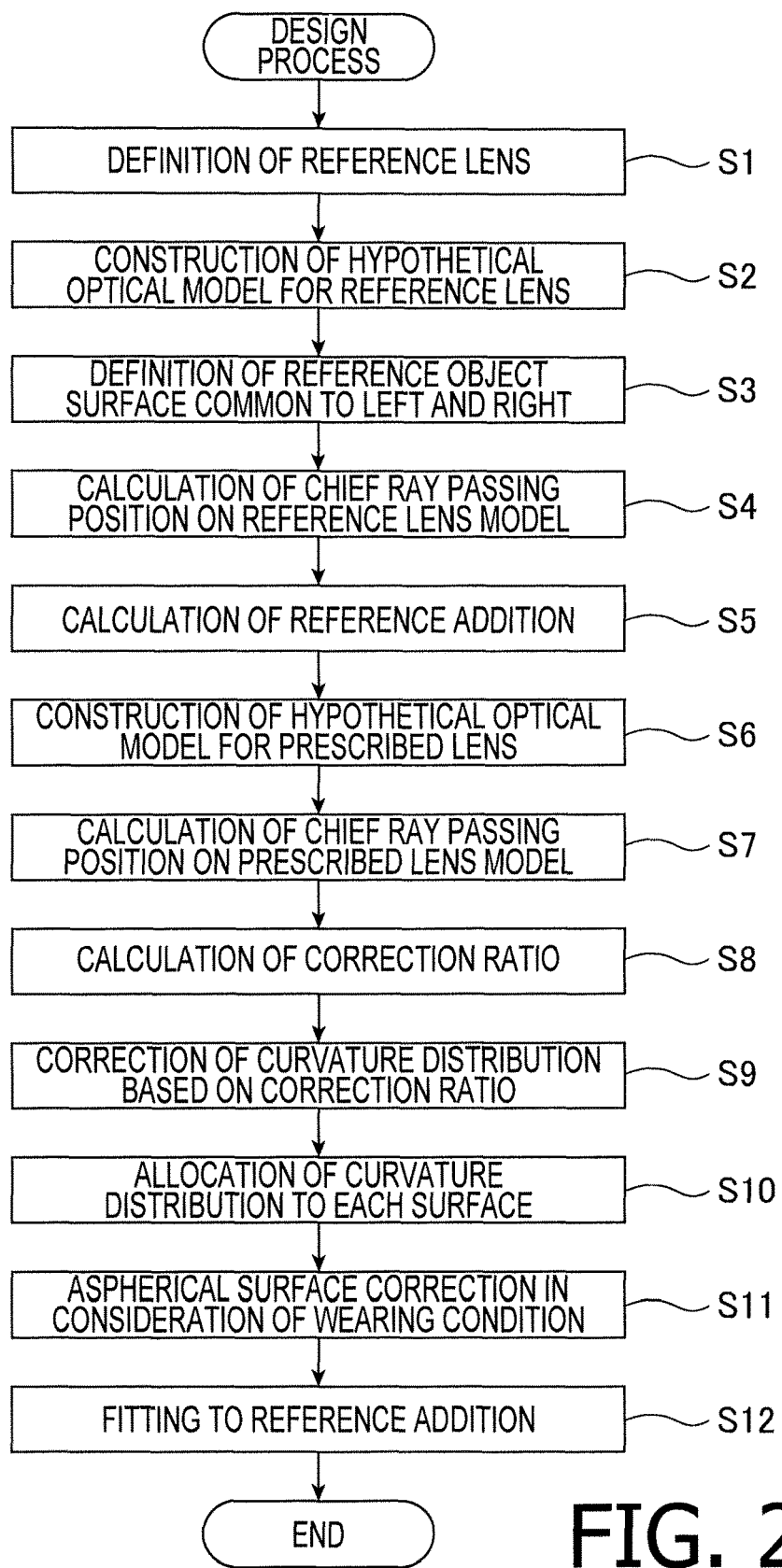
FIG. 2 is a flowchart illustrating a design process of spectacle lenses by a spectacle lens design computer according to the embodiment of the invention.

FIG. 2 is a flowchart illustrating a design process of spectacle lenses by the spectacle lens design computer 202. In the following explanation, as design targets to be prescribed for wearers, of anisometropia, various types of distance-near spectacle lenses being a pair of spectacle lenses having left and right distance dioptric powers different from each other, such as, a one side progressive surface type having a progressive power component on an inner surface or an outer surface, a both side progressive surface type having a progressive power component on both of inner and outer surfaces, an integrated double surface type in which a vertical progressive power component is assigned to an outer surface and a horizontal progressive power component is assigned to an inner surface are assumed. However, the present design process may be applied to spectacle lenses of another type of item group (being a pair of spectacle lenses having left and right dioptric powers different from each other at predetermined reference points) having a progressive power portion in which the refractive power changes progressively, such as a intermediate-near progressive power lens or a near-near progressive power lens of a one side progressive surface type, a both side progressive surface type and an integrated double surface type.

Strictly speaking, a direction of an eye axis and a direction of a visual line are different from each other in ocular optics; however, effect by the difference therebetween can be neglected. Therefore, in this specification, it is assumed that directions of an eye axis and a visual line coincide with each other, and the difference between the eye axis and the visual line is caused only by the prismatic effect of a lens.

Figure 12:
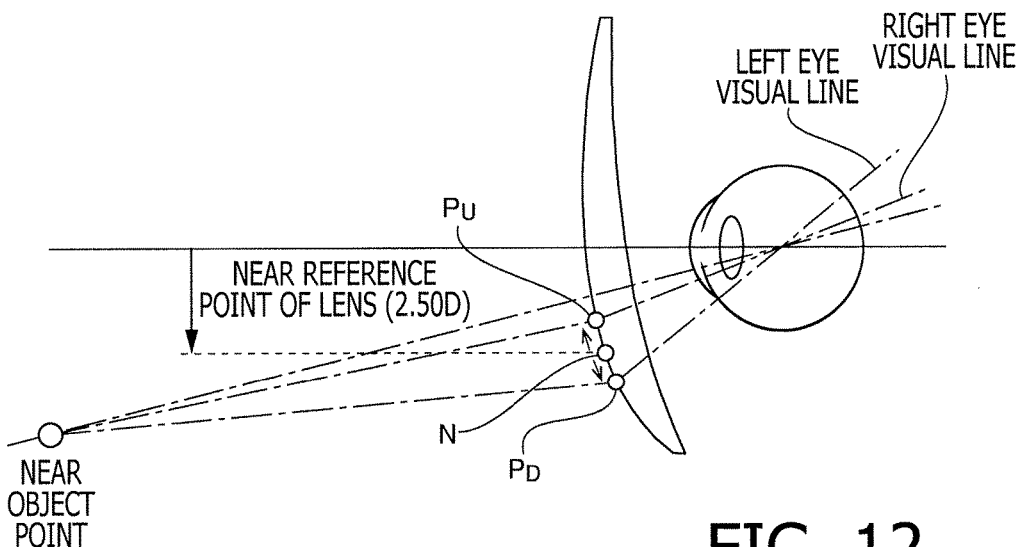
FIG. 12 is an explanatory illustration for explaining a conventional problem where a burden is imposed on eyes of a wearer due to the difference between the left and right substantive addition.

Hereafter, explanation is given regarding a problem which occurs on a pair of spectacle lenses having left and right distance dioptric powers different from each other with reference to FIG. 12. FIG. 12 illustrates a state where a wearer of anisometropia performs binocular vision for a near object point through spectacle lenses having prescribed dioptric power indicated below.

Prescribed dioptric power (Right): S+2.00 ADD2.50
Prescribed dioptric power (Left): S+4.00 ADD2.50

Although in FIG. 12 left and right spectacle lenses are illustrated as one lens having a common shape for convenience of explanation, actually the left and right spectacle lenses have the different shape depending on their respective prescriptions.

As shown in FIG. 12, when a wearer of anisometropia performs binocular vision for a near object point, a shift occurs between left and right visual lines due to the difference in prismatic effects which correspond to the difference in prescribed dioptric powers. Specifically, the wearer performs binocular vision through points other than a near reference point N (a point having the addition of 2.50 D at which the dioptric power for a near portion is set) laid out on the lens. In the example shown in FIG. 12, the right eye directs the visual line to the near object point through a point $P_U$ (a point where the addition power is smaller than 2.50 D) which is upper than the near reference point N, and the left eye directs the visual line to the near object point through a point $P_D$ (a point where the addition power is larger than or equal to 2.50 D) which is lower than the near reference point N. Since the left and right visual lines are shift with respect to each other as described above, the addition effects actually applied to the left and right eyes are different from each other. Therefore, theoretically different degrees of accommodation are required for the left and right eyes. However, physiologically the degrees of accommodation acting on the left and right eyes are equal to each other (Hering's law of equal innervation). Accordingly, the wearer is forced to view the near object point in a state where a burden is imposed on the eyes, i.e., a state where addition effects actually acting on the left and right eyes are different from each other. In this specification, the addition effect substantially acting on the eyes is also referred to as "substantive addition".

Through intensive studies carried out by the inventor of the present invention, the inventor has found that as the degree of difference between prescribed distance dioptric powers for the left and right eyes increases and also as the object distance becomes short, the difference between the substantive additions for the left and right eyes increases. In FIG. 12, as an example where the difference between the substantive additions for the left and right eyes becomes large, a state where a wearer views a near object point is illustrated. That is, the inventor has also found that the above described problem occurs not only in a case of a short distance but also in a case of a distance (e.g., a long distance or an intermediate distance) farther than the short distance.

In this embodiment, by performing a design process explained below, spectacle lenses capable of ensuring suitable binocular vision at each object distance (from a long distance to a short distance) while resolving the above described problem are designed. In the following, the design process of spectacle lenses by the spectacle lens design computer 202 is specifically explained.

S1 in FIG. 2 (Definition of Reference Lens)

The spectacle lens design computer 202 defines a reference lens based on a prescription for a wearer received from the store computer 100 via the host computer 200. The reference lens is a spectacle lens hypothetically defined, common to the left and right eyes, in accordance with the fact that physiologically the degrees of accommodation acting on the left and right eyes are equal to each other, and is configured such that the distance dioptric power is set to a common average value of the left and right prescribed distance dioptric powers. That is, the reference lens is a spectacle lens having a progressive power portion, and has the distance dioptric power and the addition power common to the left and right. In the following, the distance dioptric power of the reference lens is defined as a reference dioptric power. For example, in the case of prescribed dioptric power (right): S+2.00 ADD2.50
prescribed dioptric power (left): S+4.00 ADD2.50,
the reference lens has:
reference dioptric power (right): S+3.00 ADD2.50
reference dioptric power (left): S+3.00 ADD2.50

It should be noted that, in this embodiment, explanation is given about the sequence where a right eye lens and a left eye lens are designed concurrently; however, in another embodiment the sequence may be performed such that one lens is designed first and thereafter the other lens is designed.

S2 in FIG. 2 (Construction of Hypothetical Optical Model for Reference Lens)

Figure 3A:
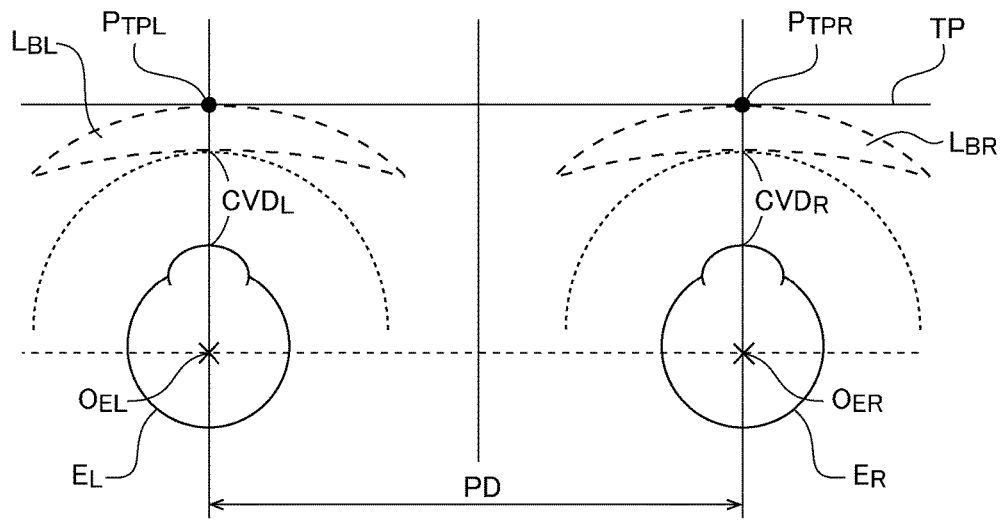
FIG. 3 is an explanatory illustration for principally explaining a step S2 in FIG. 2, and illustrates an example of a hypothetical optical model and a general lens layout for a reference lens.

The spectacle lens design computer 202 constructs a predetermined hypothetical optical model having eye balls and spectacle lenses, supposing a state where a wearer wears spectacle lenses (Reference Lens: S+3.00 ADD 2.50). FIG. 3A illustrates an example of a hypothetical optical model constructed by the spectacle lens design computer 202. As shown in FIG. 3A as an example, in each of the drawings illustrating the hypothetical optical model, an eyeball model E is viewed from the head (i.e., for the left and right eyes, the inner side in the drawings is the nose size and the outer side in the drawings is the ear side). Further, in the flowing explanation, reference numbers for the right eye are assigned a subscript of a letter R, and reference numbers for the left eye are assigned a subscript of a letter L. Furthermore, for explanation about the both of left and right eyes, these subscripts are not assigned.

The eye axis lengths of eyeballs differ between hyperopia and myopia. For this reason, the spectacle lens design computer 202 stores in advance information on how the eye axis lengths differ depending on degrees of hyperopia and myopia. Of this information, the spectacle lens design computer 202 chooses a suitable eyeball model E according to the prescription (a spherical power, a cylindrical power) of a wearer included in the ordering data, and disposes the chosen eyeball model E in a hypothetical model space as shown in FIG. 3A. More specifically, an eyeball model $E_R$ and an eyeball model $E_L$ are disposed such that an eyeball rotation center $O_{ER}$ and an eyeball rotation center $O_{EL}$ are separated by a pupillary distance PD.

The spectacle lens design computer 202 disposes reference lens models $L_{BR}$ and $L_{BL}$ corresponding to the reference lenses at positions spaced by predetermined vertex distances $CVD_R$ and $CVD_L$ from the eyeball models $E_R$ and $E_L$. The vertex distance CVD is a distance between the rear vertex of the reference lens model $L_B$ and the cornea vertex of the eyeball model E, and is, for example, 12.5 mm. It should be noted that the center thickness of the reference lens model $L_B$ is determined based on, for example, the prescription and the refractive index of glass material. The reference lens model $L_B$ may be disposed in the hypothetical model space while considering an inclination (a pantoscopic angle and a face form angle) of the spectacle lens. For convenience of explanation, a tangential plane to the reference lens model $L_B$ at the outer surface vertex is defined as a tangential plane TP, an intersection between a visual line of the eyeball model $E_R$ in a front view and the tangential plane TP is defined as a reference point $P_{TPR}$, and an intersection between a visual line of the eyeball model $E_L$ in a front view and the tangential plane TP is defined as a reference point $P_{TPL}$. These reference points $P_{TP}$ are lens design centers, and the lens design center is an intermediate point between a pair of hidden marks (which are described later).

Figure 3B:
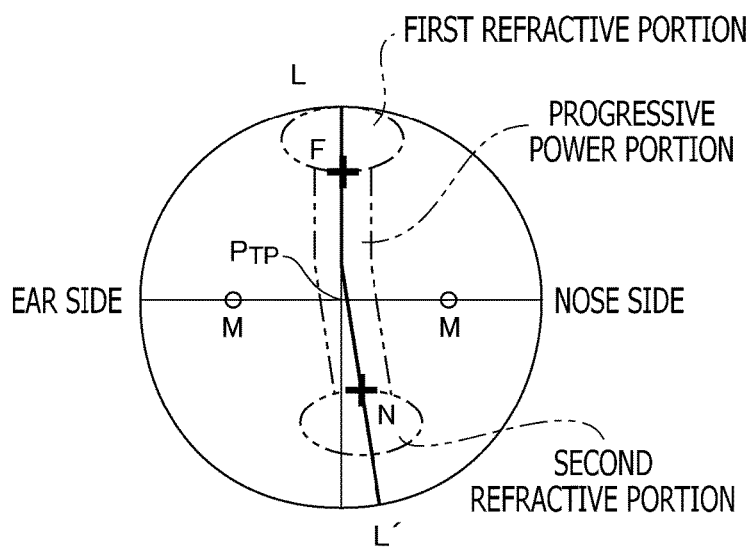

FIG. 3B generally illustrates a layout of the spectacle lens defined by the present design process. As shown in FIG. 3B, the spectacle lens according to the embodiment is configured such that, on the principal meridian LL', a distance reference point F (a point at which the dioptric power for a distance portion is set) is disposed on the upper side of the lens design center, and a near reference point N is disposed on the lower side of the lens design center. The principal meridian LL' is shifted inward to the nose side considering the convergence of eyes, from an intermediate point of a progressive zone toward the near reference point N. Positions of the near reference point N and the distance reference point F are identified based on the pair of hidden marks M directly marked on a lens surface. As described later, the spectacle lens according to the embodiment is configured such that the lengths and the widths of the progressive power zones are different from each other between the left and right. Therefore, positions of the near reference points N and the distance reference points F on the lens surface are different from each other between the left and right.

S3 in FIG. 2 (Definition of Reference Object Surface Common to Left and Right)

Figure 4A:
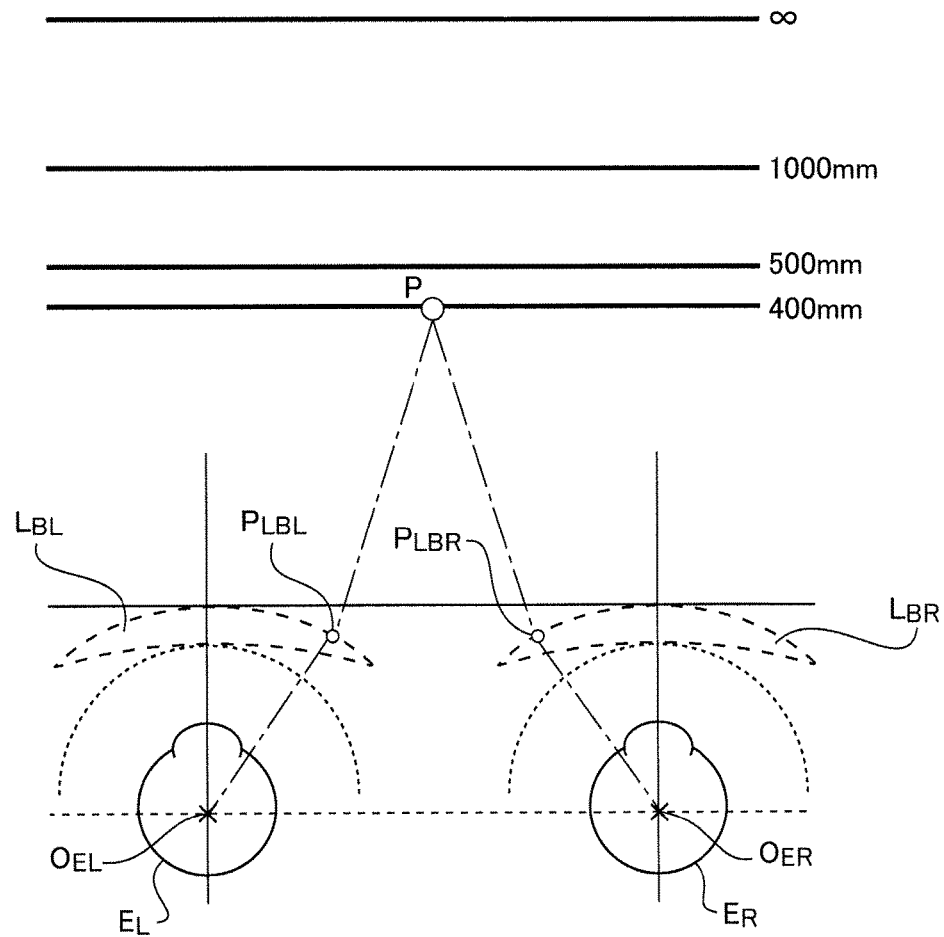
FIG. 4 is an explanatory illustration for principally explaining steps S3 and S4 in FIG. 2, and illustrates a reference object surface and a reference side chief ray passing position.
Figure 4B:
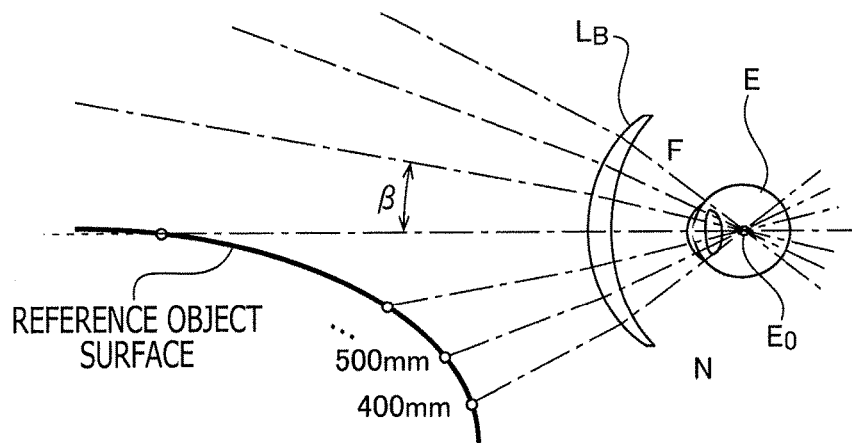

The spectacle lens design computer 202 defines, common to the left and right, a reference object surface including a plurality of object surfaces disposed at different object distances, in accordance with the fact that physiologically the degrees of accommodation of the left and right eyes are equal to each other, based on the reference lens model $L_B$. Each of FIGS. 4A and 4B illustrates the reference object surface common to the left and right defined in the hypothetical model space. As shown in FIG. 4B, the reference object surface is a single continuous surface smoothly connecting the object surfaces disposed at the respective object distances; however, in FIG. 4A, of the object surfaces, only discrete object surfaces used for design of the spectacle lenses are illustrated for convenience of explanation. As shown in FIG. 4A, the object surfaces used for design of the spectacle lenses include object surfaces disposed at an object distance corresponding to the near dioptric power (a targeted short work distance (close work distance) and is 400 mm in this case), an object distance corresponding to the dioptric power at sample points on the principal meridian LL' in the progressive zone (500 mm, . . . 1000 mm, . . . ), and an object distance (a distance which can be regarded as an infinite distance, such as 5000 mm) corresponding to the distance dioptric power (the reference dioptric power). Although in FIG. 4A the object surface is defined at a position away from the line connecting the eyeball rotation center $O_{ER}$ and the eyeball rotation center $O_{EL}$ by an object distance corresponding to each dioptric power; however, in another embodiment the object surface may be defined at a position on an eye front hemisphere which has the center at the intermediate point between the eyeball rotation center $O_{ER}$ and the eyeball rotation center $O_{EL}$ and has the radius equal to the object distance corresponding to each dioptric power.

In conventional lens design of an spectacle lens having a progressive power portion, generally a common dioptric power distribution is set for the left and right, and when the prescribed left and right dioptric powers are different from each other, spectacle lenses are designed such that correction based on the respective different prescribed powers is applied to the set dioptric power distribution, and, as a result of the correction, which distance an wearer finally views (i.e., an object distance) is determined. For this reason, the object surfaces assumed in design are different between the left and right due to the difference between the left and right dioptric powers. However, when a person actually views an object, binocular vision is realized in such a manner that left and right visual lines catch the same object. Even when the spectacle lenses of which object surfaces are different from each other (i.e., addition refractive effects from a long distance to a short distance are different between the left and right) are worn, physiologically, only the same accommodation acts on the left and right eyes. Therefore, when the wearer performs binocular vision, the wearer is not able to cancel out the blur caused by the difference between the object surfaces assumed for the left and right lenses, i.e., the difference between the addition power effects. By contrast, according to the embodiment, the reference object surface common to the left and right is defined based on the hypothetical reference lens model $L_B$ before spectacle lenses are designed (or independently of design of spectacle lenses) as described above. That is, according to the embodiment, an index indicating at which distance a wearer views an object in the case where the left and right prescribed dioptric powers are different from each other is defined in advance in common for the left and right in accordance with the fact that physiologically the degrees of accommodation of the left and right eyes are equal to each other, and the following lens design process is performed. Therefore, a conventional problem that when the prescribed dioptric powers of the left and right are different from each other, the object surfaces of the left and right are different from each other can be avoided.

S4 in FIG. 2 (Calculation of Chief Ray Passing Position on Reference Lens Model $L_B$)

As shown in FIG. 4A, the spectacle lens design computer 202 calculates positions (Reference side chief ray passing positions $P_{LBR}$ and $P_{LBL}$) on the left and right reference lens models $L_{BR}$ and $L_{BL}$ (on the outer surfaces) at which chief rays (a chain line) from an arbitrary point P on the object surface pass, by performing an optical calculation process using, for example, ray tracing. The chief ray is defined as a light ray proceeding from the arbitrary point P on the reference object surface to the eyeball rotation center $O_E$. The spectacle lens design computer 202 calculates the reference side chief ray passing position $P_{LB}$ corresponding to each point on each object surface so that the reference side chief ray passing position $P_{LB}$ is disposed on the entire outer surface of the reference lens model $L_B$. In the following, for convenience of explanation, each arbitrary point P on each object surface used for calculation of step S4 is referred to as a chief ray start point P. Furthermore, for convenience of explanation, in the following process, it is assumed that the lens design is performed on the premise that the curvature distribution (curvature distribution corresponding to the transmission power distribution) exists only on the outer surface of various lens models.

S5 in FIG. 2 (Calculation of Reference Addition $ADD_S$)

Figure 5:
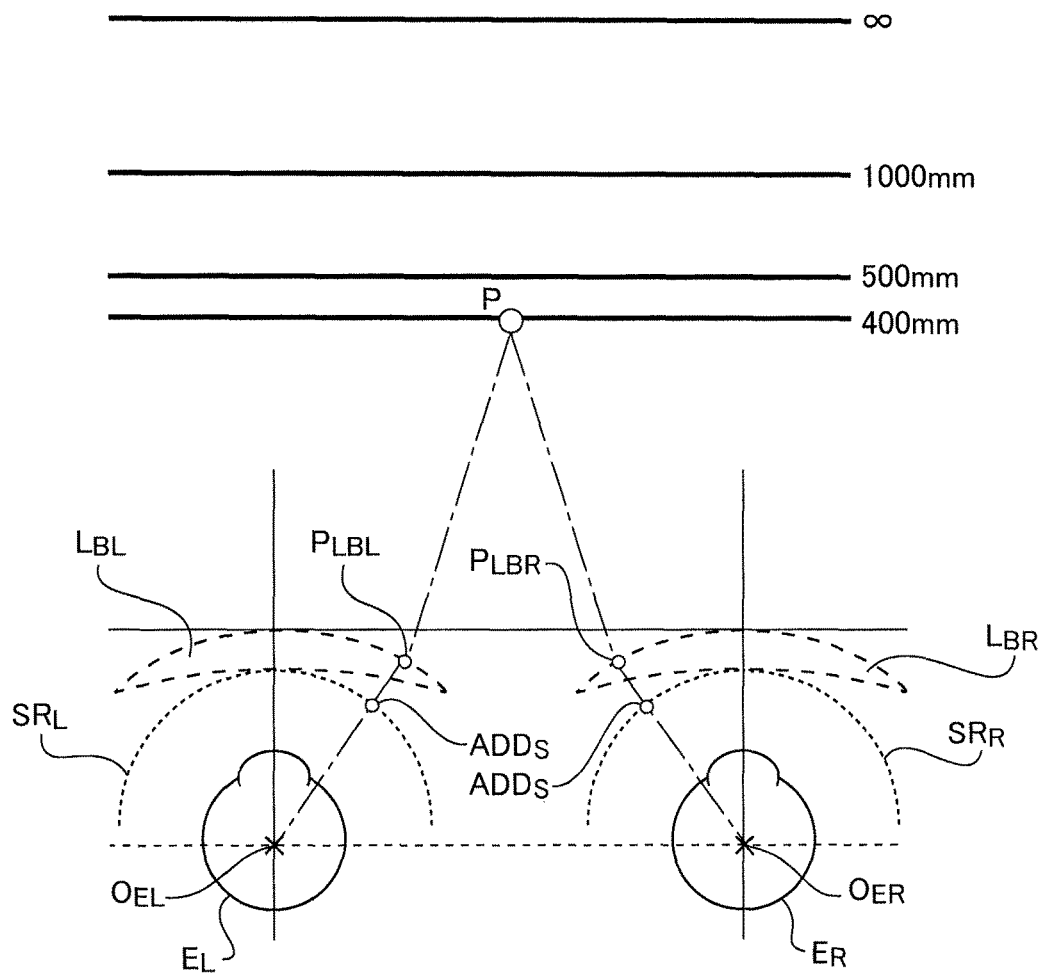
FIG. 5 is an explanatory illustration for principally explaining a step S5 in FIG. 2, and illustrates a reference addition on a reference sphere.

As shown in FIG. 5, the spectacle lens design computer 202 defines a reference sphere SR as an evaluation surface for evaluating a targeted transmission dioptric power. The reference sphere SR is a sphere which has the center at the eyeball rotation center $O_E$ of the eyeball model E and has a radius equal to a distance from the eyeball rotation center $O_E$ to the rear vertex of the reference lens model $L_B$. The spectacle lens design computer 202 calculates the transmission dioptric power on the reference sphere SR for the light ray passing through the near reference point N of the reference lens model $L_B$. The transmission dioptric power calculated herein is a near dioptric power of the reference lens model $L_B$, and the reference addition $ADD_S$ is defined as a value obtained by subtracting the near dioptric power from the distance dioptric power. Regarding a lens designed on the assumption that the difference between the near dioptric power and the distance dioptric power on the reference sphere SR is the addition, the reference addition $ADD_S$ becomes a targeted dioptric power (ADD 2.50) common to the left and right.

S6 in FIG. 2 (Construction of Hypothetical Optical Model for Prescribed Lens)

Figure 6:
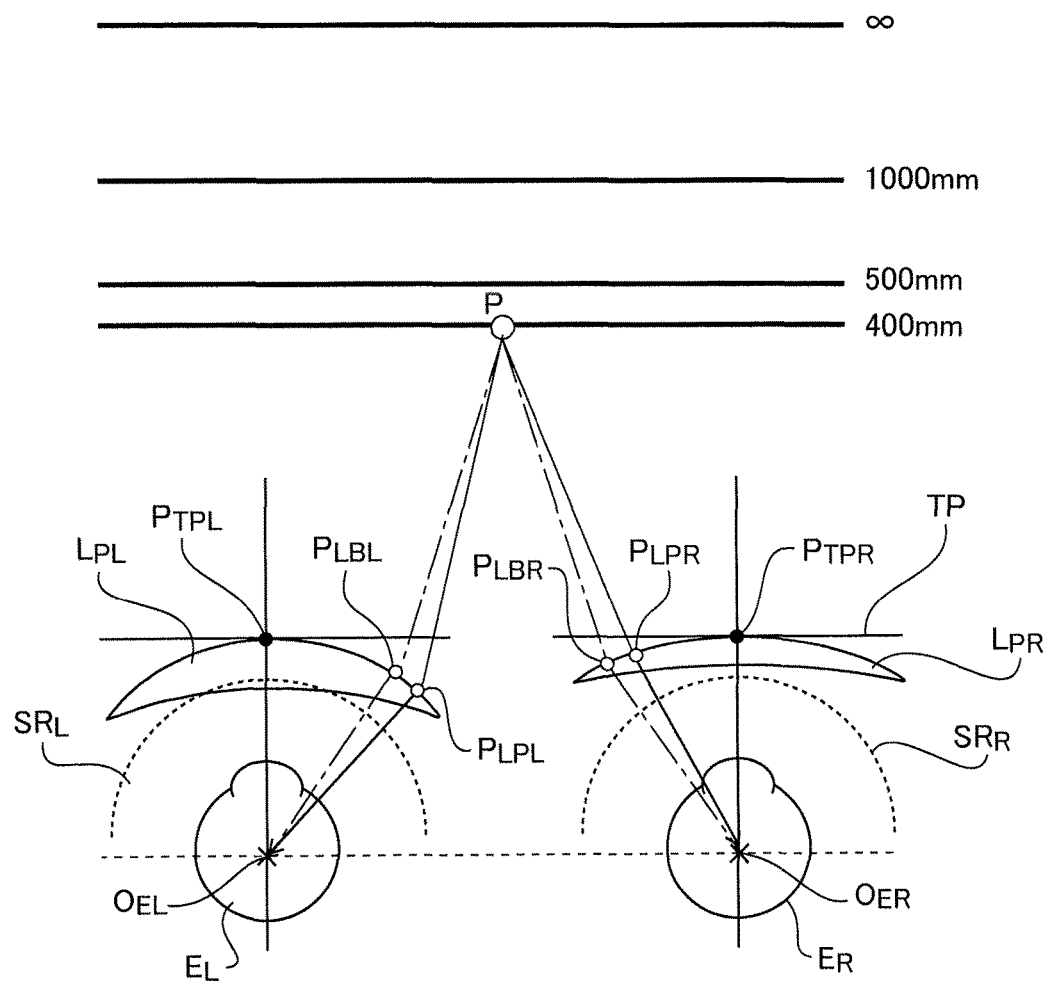
FIG. 6 is an explanatory illustration for principally explaining steps S6 and S7 in FIG. 2, and illustrates an example of a hypothetical optical model and a prescribed side chief ray passing position for a prescribed lens.

The spectacle lens design computer 202 changes the hypothetical optical model constructed in step S2 in FIG. 2 to another hypothetical optical model having eyeballs and spectacle lenses defined on the assumption that the wearer wears the spectacle lenses (prescribed lens (right): S+2.00 ADD2.50, prescribed lens (left): S+4.00 ADD2.50). FIG. 6 illustrates an example of the hypothetical optical model after change by the spectacle lens design computer 202. As shown in FIG. 6, the spectacle lens design computer 202 disposes the prescribed lens models $L_{PR}$ and $L_{PL}$ respectively corresponding to the prescribed lenses (right and left) for the eyeball models $E_R$ and $E_L$. The prescribed lens model $L_P$ is defined by a known design method based on the prescription, and detailed explanation thereof will be omitted. In the prescribed lens model $L_P$ at this stage, shift of the right and left visual lines are caused by the difference between the right and left prismatic effects.

More specifically, the spectacle lens design computer 202 disposes the prescribed lens model $L_{PR}$ such that the outer surface vertex is situated at the reference point $P_{TPR}$ and the lens contacts the tangential plane TP at the outer surface vertex, and disposes the prescribed lens model $L_{PL}$ such that the outer surface vertex is situated at the reference point $P_{TPL}$ and the lens contacts the tangential plane TP at the outer surface vertex. The center thickness of the prescribed lens model Lp is also determined based on the prescription and the refractive index of the glass material. When the reference lens model $L_B$ is disposed in the hypothetical optical space while considering an inclination (a pantoscopic angle and a face form angle), the prescribed lens model $L_P$ is also disposed while considering the same condition.

S7 in FIG. 2 (Calculation of Chief Ray Passing Position on Prescribed Lens Model $L_P$)

As shown in FIG. 6, the spectacle lens design computer 202 calculates positions (prescribed side chief ray passing positions $P_{LPR}$ and $P_{LPL}$) on the prescribed lens models $L_{PR}$ and $L_{PL}$ (on the outer surface in this case) at which the chief rays (a solid line) from each chief ray start point P (i.e., an arbitrary point P on the object surface defined in common for the left and right in accordance with the fact that physiologically the degrees of accommodation for the left and right are equal to each other) used in step S4 in FIG. 2 (calculation of chief ray passing position on reference lens model $L_B$) pass, by executing an optical calculation process using, for example, ray tracing. As a result, the prescribed side chief ray passing position $P_{LP}$ is disposed on the entire outer surface of the prescribed lens model L.

S8 in FIG. 2 (Calculation of Correction Ratio R)

As shown in FIG. 7A, a distance between the reference point $P_{TP}$ and the reference side chief ray passing position $P_{LB}$ is defined as a reference side distance $D_{LB}$, and a distance between the reference point $P_{TP}$ and the prescribed side chief ray passing position $P_{LP}$ is defined as a prescribed side distance $D_{LP}$. In this case, the spectacle lens design computer 202 calculates a correction ratio R (=(the prescribed side distance $D_{LP}$ corresponding to a certain chief ray start point P)/(the reference side distance $D_{LB}$ corresponding to the same chief ray start point P)) corresponding to each chief ray start point P. FIG. 7B illustrates the relationship between the prescribed side distance $D_{LPR}$ (unit: mm) on the principal meridian LL' between the reference point $P_{TPR}$ and the near reference point N, and the correction ratio $R_R$ (=the prescribed side distance $D_{LPR}$/the reference side distance $D_{LBR}$) for the right eye side. FIG. 7C illustrates the relationship between the prescribed side distance $D_{LPL}$ (unit: mm) on the principal meridian LL' between the reference point $P_{TPL}$ and the near reference point N, and the correction ratio $R_L$ (=the prescribed side distance $D_{LPL}$/the reference side distance $D_{LBL}$) for the left eye side.

Since the prescribed lens model $L_{PR}$ has the prescribed dioptric power (S+2.00) which is on the minus side with respect to the reference dioptric power (S+3.00), the prescribed side chief ray passing position $P_{LPR}$ becomes closer to the reference point $P_{TPR}$ than the reference side chief ray passing position $P_{LBR}$ on the principal meridian LL' (see FIG. 7A). As shown by a solid line in FIG. 7B, the correction ratio $R_R$ becomes smaller, in response to the difference between the prismatic effects of the prescribed lens model $L_{PR}$ and the reference lens model $L_{BR}$, as the prescribed side distance $D_{LPR}$ becomes long (as the prescribed side chief ray passing position $P_{LPR}$ moves away from the reference point $P_{TPR}$ and thereby approaches the near reference point N).

On the other hand, since the prescribed lens model $L_{PL}$ has the prescribed dioptric power (S+4.00) which is on the plus side with respect to the reference dioptric power (S+3.00), the reference side chief ray passing position $P_{LBR}$ becomes closer to the reference point $P_{TPL}$ than the prescribed side chief ray passing position $P_{LPL}$ on the principal meridian LL' (see FIG. 7A). As shown in by a solid line in FIG. 7C, the correction ratio $R_L$ becomes larger, in response to the difference between the prismatic effects of the prescribed lens model $L_{PL}$ and the reference lens model $L_{BL}$, as the prescribed side distance $D_{LPL}$ becomes long (as the prescribed side chief ray passing position $P_{LPL}$ moves away from the reference point $P_{TPL}$ and thereby approaches the near reference point N).

For reference, an example defined by applying the correction ratio R according to the embodiment to the patent document 1 is illustrated by a dashed line in each of FIGS. 7B and 7C. In the case of the patent document 1, as shown in FIGS. 7B and 7C, both of the correction ratio $R_R$ and the correction ratio $R_L$ are constant regardless of the prescribed side chief ray passing positions $P_{LBR}$ and $P_{LBL}$.

S9 in FIG. 2 (Correction of Curvature Distribution based on Correction Ratio R)

The spectacle lens design computer 202 corrects the curvature distribution of the prescribed lens model $L_P$ by executing the enlarging or reducing operation, based on the correction ratio R corresponding to each chief ray start point P, for the curvature distribution (hereafter referred to as "progressive distribution", which is a distribution obtained by extracting only a curvature distribution adding a progressive power component, of the whole curvature distribution of the lens) providing the progressive refractive power assumed for the reference lens model $L_B$. Specifically, as shown in the following expression, the reference progressive distribution (the progressive distribution of the reference lens model $L_B$) is corrected by enlarging or reducing the reference progressive distribution in accordance with the corresponding correction ratio R, and the corrected progressive distribution of the reference lens model $L_B$ is applied as the progressive distribution of the prescribed lens model L.

(curvature $K(x,y)$ of the progressive distribution of the prescribed lens)=(curvature $K(x/Rx, y/Ry)$ of the progressive distribution of the reference lens)

where x and y denote coordinates of the prescribed side chief ray passing position $P_{LP}$, and Rx and Ry denote the correction ratio R in the x direction and y direction.

Let us consider, for example, a case where change of the addition in the progressive zone is constant on the prescribed lens model $L_{PR}$, and the curvature at each prescribed side chief ray passing position $P_{LPR}$ disposed on the principal meridian LL' is to be corrected based on the correction ratio $R_R$ shown in FIG. 7B. In this case, the curvature relating to the progressive refractive power effect at the position $P_{LPR}$ on the prescribed lens model $L_{PR}$ (i.e., curvature which is defined by excluding a component by the distance dioptric power and which is a curvature component adding the addition effect) is operated so as to coincide with the curvature relating to the progressive refractive power effect at the position $P_{LBR}$ on the reference lens model $L_{BR}$. In other words, the curvature corresponding to the addition effect at the reference side chief ray passing position $P_{LBR}$ is relocated to the prescribed side chief ray passing position $P_{LPR}$ corresponding to the correction ratio $R_R$. Since the correction ratio $R_R$ differs between positions, change of addition after correction in the progressive zone becomes different in shape from change of addition in the progressive zone of the reference lens model $L_{BR}$ depending on the correction ratio $R_R$ (for example, the changing ratio of addition becomes larger as a point approaches the near reference point N from the reference point $P_{TPR}$). Regarding the prescribed lens model $L_{PR}$ having the prescribed dioptric power on the minus side with respect to the reference dioptric power, the entire progressive distribution is reduced, in accordance with the correction ratio $R_R$, with respect to the progressive distribution of the reference lens model $L_{BR}$, and therefore the length of the progressive zone becomes short and the width of the progressive zone becomes narrow.

Let us further consider a case where change of addition in the progressive zone on the prescribed lens model $L_{PL}$ is constant, and the curvature at each prescribed side chief ray passing position $P_{LPL}$ disposed on the principal meridian LL' is corrected based on the correction ratio $R_L$ illustrated in FIG. 7C. In this case, the curvature relating to the progressive refractive power effect at the position $P_{LPL}$ on the prescribed lens model $L_{PL}$ (i.e., curvature which is defined by excluding a component by the distance dioptric power and which is a curvature component adding the addition effect) is operated so as to coincide with the curvature relating to the progressive refractive power effect at the position $P_{LBL}$ of the reference lens model $L_{BL}$. In other words, the curvature corresponding to the addition effect at the reference side chief ray passing position $P_{LBL}$ is relocated to the prescribed side chief ray passing position $P_{LPL}$ corresponding to the correction ratio $R_L$. Since the correction ratio $R_L$ differs between positions, change of the addition after correction in the progressive zone becomes different in shape from change of addition in the progressive zone of the reference lens model $L_{BL}$ depending on the correction ratio $R_L$ (for example, the changing ratio of addition becomes smaller as a point approaches the near reference point N from the reference point $P_{TPL}$). Regarding the prescribed lens model $L_{PL}$ having the prescribed dioptric power on the plus side with respect to the reference dioptric power, the entire progressive distribution is enlarged, in accordance with the correction ratio $R_L$, with respect to the progressive distribution of the reference lens model $L_{BL}$, and therefore the length of the progressive zone becomes long and the width of the progressive zone becomes wide.

Hereafter, explanation about the correction of the curvature distribution according to the embodiment is supplemented with reference to FIG. 12. Since the progressive zone becomes short when the curvature distribution (the progressive distribution) of the prescribed lens model $L_{PR}$ is corrected based on the correction ratio $R_R$ of FIG. 7B, a point at which the addition substantially becomes 2.50 D approaches the right eye visual line passing point $P_U$. Since the progressive zone becomes long when the curvature distribution (the progressive distribution) of the prescribed lens model $L_{PL}$ is corrected based on the correction ratio $R_L$ of FIG. 7C, a point at which the addition substantially becomes 2.50 D approaches the left eye visual line passing point $P_D$. That is, since in the example of FIG. 12 the difference between the addition effects acting on the left and right eyes of the wearer viewing the near object point is reduced, a burden on the eyes of the wearer caused by the difference between the substantive additions of the left and right can be reduced.

As described before, the problem shown in FIG. 12 also occurs at another object distance, such as an intermediate object distance, although in such a case the degree of the problem is not so serious with respect to the case of viewing at a short distance. Therefore, according to the embodiment, as can be seen from the correction ratio R shown in FIGS. 7B and 7C, the difference between the substantive additions of the left and right caused when an object at an intermediate distance is viewed is suitably reduced through the suitable enlarging or reducing operation for the curvature distribution (the progressive distribution).

Figure 8A:
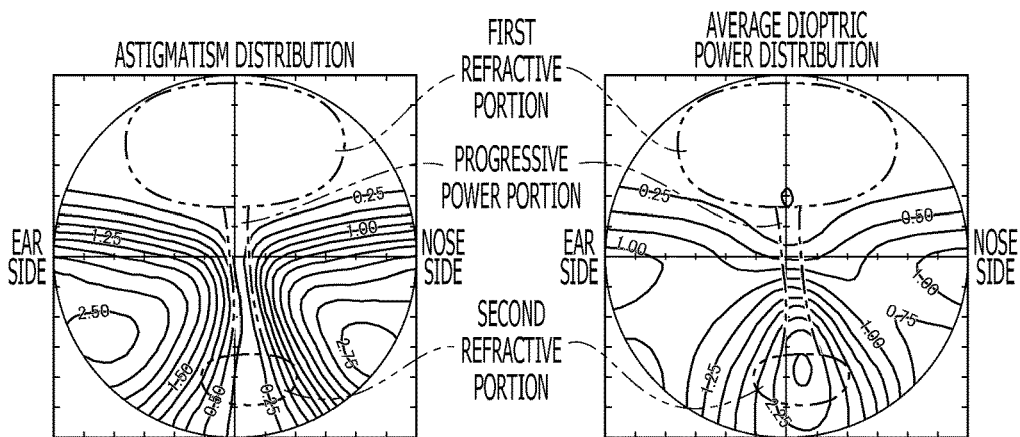
FIG. 8 is an explanatory illustration for principally explaining a step S9 in FIG. 2, and illustrates transmission dioptric power distribution of each lens model.
Figure 8B:
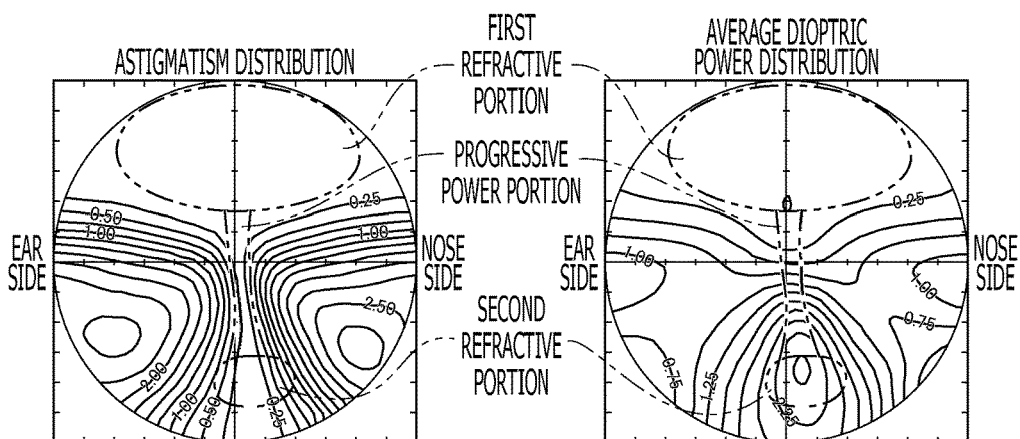

FIG. 8A illustrates an example of the transmission dioptric power distribution on the reference sphere SR of the reference lens model $L_B$. The transmission dioptric power distribution illustrated herein is the astigmatism distribution and the average dioptric power distribution, and is equivalent to the curvature distribution. FIG. 8B illustrates an example of the transmission dioptric power distribution on the reference sphere SR of the prescribed lens model $L_{PR}$, and FIG. 8C illustrates an example of the transmission dioptric power distribution on the reference sphere SR of the prescribed lens model $L_{PL}$.

The transmission dioptric power distribution (i.e., the curvature distribution) of the prescribed lens model $L_{PR}$ illustrated as an example in FIG. 8B has been subjected to the reducing operation according to the correction ratio $R_R$ at each prescribed side chief ray passing position $P_{LPR}$. That is, contour lines of the astigmatism distribution and contour lines of the average dioptric power distribution are reduced in accordance with the correction ratio $R_R$, and basically as the prescribed side chief ray passing position $P_{LPR}$ moves away from the reference point $P_{TPR}$, the shape of the contour lines are further reduced.

Figure 8C:
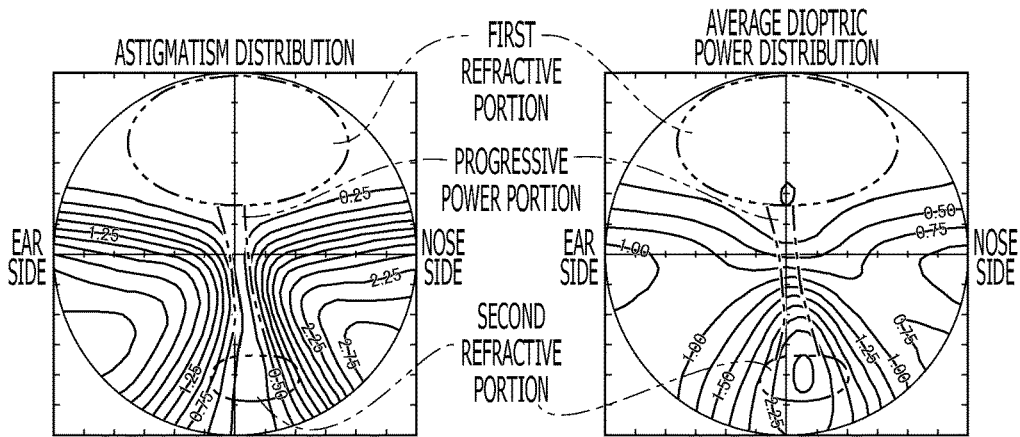

The transmission dioptric power distribution (i.e., the curvature distribution) of the prescribed lens model $L_{PL}$ illustrated as an example in FIG. 8C has been subjected to the enlarging operation according to the correction ratio $R_L$ at each prescribed side chief ray passing position $P_{LPL}$. That is, contour lines of the astigmatism distribution and contour lines of the average dioptric power distribution are enlarged in accordance with the correction ratio $R_L$, and basically as the prescribed side chief ray passing position $P_{LPL}$ moves away from the reference point $P_{TPL}$, the shape of the contour lines are further enlarged.

S10 in FIG. 2 (Allocation of Curvature Distribution to Each Surface)

The spectacle lens design computer 202 allocates the curvature distribution of the prescribed lens model $L_P$ corrected in step S9 in FIG. 2 to the outer surface and the inner surface of the prescribed lens model $L_P$ in accordance with a structure (an inner aspherical surface type, an outer aspherical surface type, a both side progressive surface type, and an integrated double surface type) of the spectacle lens. As a result, the shape of the prescribed lens model $L_P$ is tentatively determined.

S11 in FIG. 2 (Aspherical Surface Correction in Consideration of Wearing Condition)

The spectacle lens design computer 202 calculates the aspherical surface correction amount according to the wearing condition (e.g., a vertex distance, a pantoscopic angle and a face form angle) for the shape of the prescribed lens model $L_P$ tentatively determined in step S10 in FIG. 2 (allocation of curvature distribution), and adds the aspherical surface correction amount to the prescribed lens model $L_P$.

Figure 9A:
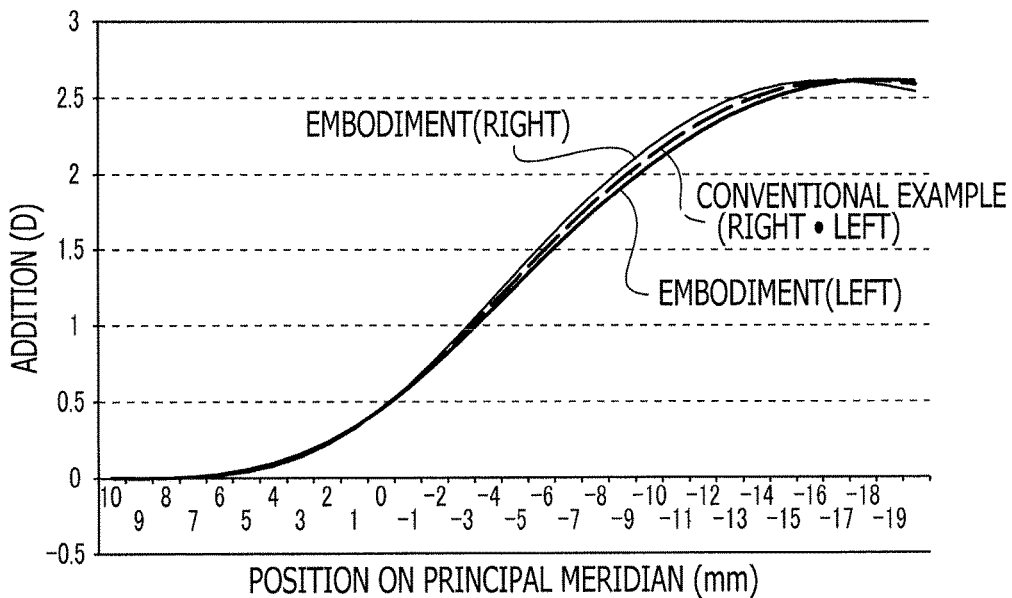
FIG. 9 is an explanatory illustration for principally explaining a step S11 in FIG. 2, and illustrates curves of addition before and after application of aspherical surface correction considering a wearing condition.
Figure 9B:
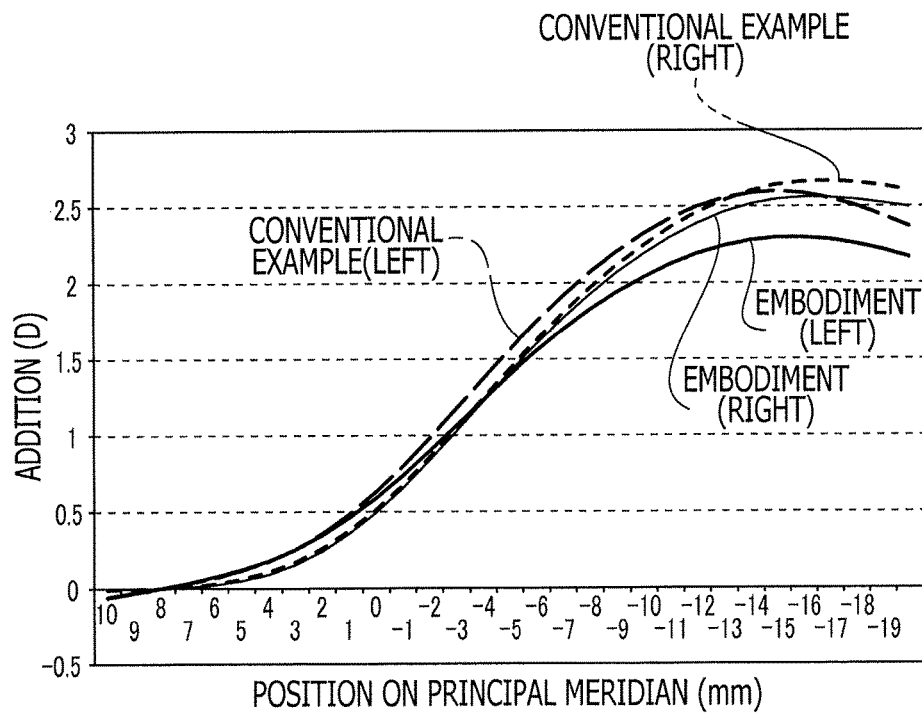

Each of FIGS. 9A and 9B illustrates the relationship between the position (unit: mm) in the progressive zone (on the principal meridian LL') and the addition (unit: D) before application of the aspherical surface correction considering the wearing condition. In each of FIGS. 9A and 9B, a solid line represents the addition of the spectacle lens according to the embodiment, and a dashed line represents the addition of an example of a conventional spectacle lens. The conventional example represents a lens in which a technical concept where the transmission dioptric power distribution is enlarged or reduced in accordance with the difference between the left and right distance dioptric powers or between the left and right substantive additions is not applied. Therefore, as shown in FIG. 9A, in the example of a conventional spectacle lens, curves of the left and right additions coincide with each other at least at a stage before application of the aspherical surface correction. On the other hand, regarding the spectacle lens according to the embodiment, as shown in FIG. 9A, curves of the left and right additions become different from each other as a result of application of the curvature distribution correction by step S9 in FIG. 2 (correction of the curvature distribution based on the correction ratio) at a stage before application of the aspherical surface correction.

In the meantime, after execution of the aspherical surface correction considering the wearing condition, curves of the left and right additions of the example of a conventional spectacle lens also become different from each other as shown in FIG. 9B. However, regarding a lens having the distance dioptric power of zero, such as a plano-convex lens, it is substantially not necessary to apply the aspherical surface correction considering the wearing condition. Furthermore, regarding a lens having a weak distance dioptric power, change of the shape by the aspherical surface correction considering the wearing condition is negligible. Therefore, regarding conventional spectacle lenses, curves of the left and right additions substantially stay at the same level even after execution of the aspherical surface correction, in regard to, among an item group, items whose total dioptric power of the left and right distance dioptric powers is weak. On the other hand, regarding the spectacle lens according to the embodiment, since the curvature distribution correction by step S9 in FIG. 2 (correction of curvature distribution based on the correction ratio) is applied, all the items (all the items suitable for the respective prescriptions) in the item group have the curves of the left and right additions different from each other regardless of the total dioptric power of the left and right distance dioptric powers.

S12 in FIG. 2 (Fitting to Reference Addition $ADD_S$)

Figure 10:
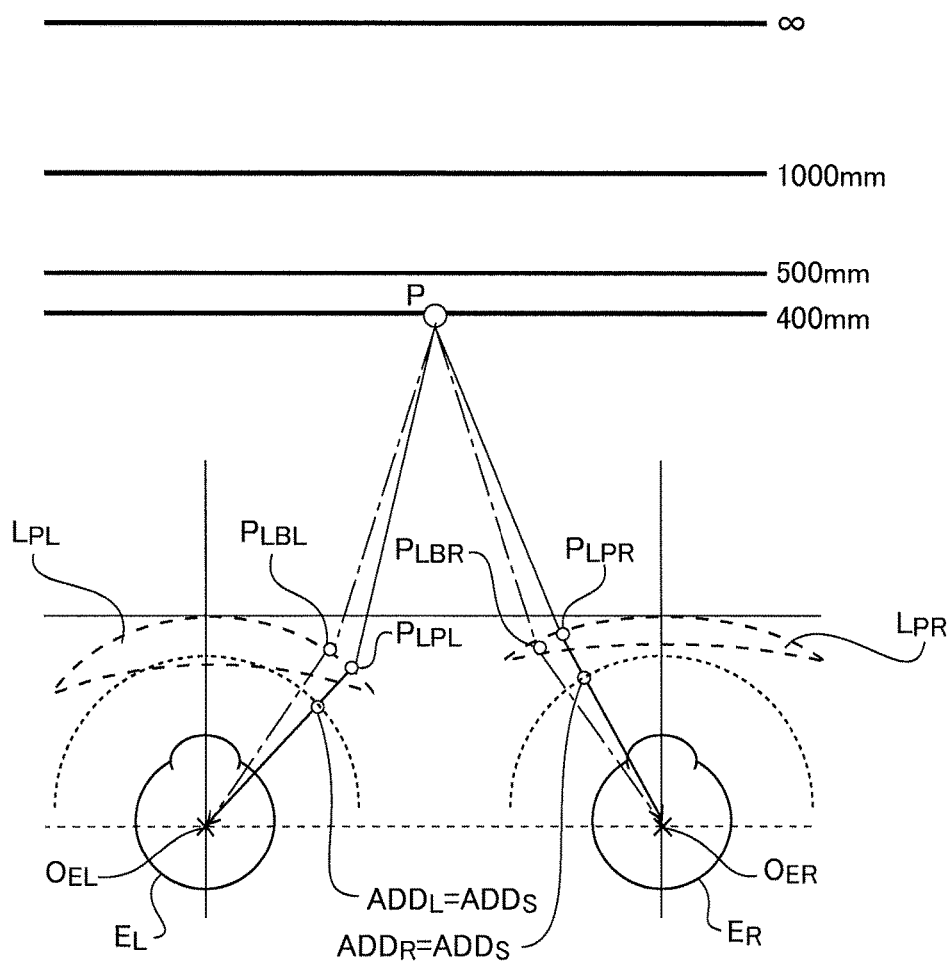
FIG. 10 is an explanatory illustration for principally explaining a step S12 in FIG. 2, and illustrates fitting of substantive addition.

The spectacle lens design computer 202 obtains the calculated substantive addition ADD by calculating the transmission dioptric power (the near dioptric power) on the reference sphere SR for the right ray passing through the near reference point N of the prescribed lens model $L_P$ to which the aspherical correction amount is added in step S11 in FIG. 2 (aspherical surface correction in consideration of wearing condition). Specifically, a substantive addition $ADD_R$ is obtained by calculating the transmission dioptric power (the near dioptric power) on the reference sphere SR for the prescribed lens model $L_{PR}$ and subtracting the distance dioptric power (S+2.00) from the calculated near dioptric power. Further, a substantive addition $ADD_L$ is obtained by calculating the transmission dioptric power (the near dioptric power) on the reference sphere SR for the prescribed lens model $L_{PL}$ and subtracting the distance dioptric power (S+4.00) from the calculated near dioptric power. The substantive additions $ADD_R$ and $ADD_L$ are corrected, to the extent that the substantive additions reach an approximated value of the targeted addition (ADD2.50), as a result of application of the curvature distribution correction by step S9 in FIG. 2 (correction of curvature distribution based on the correction ratio). Therefore, as described above, the difference between the addition effects substantially act on the left and right eyes of the wearer are reduced, and the burden on the eyes of the wearer due to the difference between the left and right substantive additions can be reduced. In the present process, as shown in FIG. 10, the substantive additions $ADD_R$ and $ADD_L$ are fitted to the reference addition $ADD_S$ (i.e., substantive additions are made equal to the reference addition) by correcting the curvature distribution of the prescribed lens model $L_P$ so as to further reduce the difference between the left and right substantive additions. As a result, the difference between the substantive additions defined when a near object point is viewed becomes almost zero.

Figure 11:
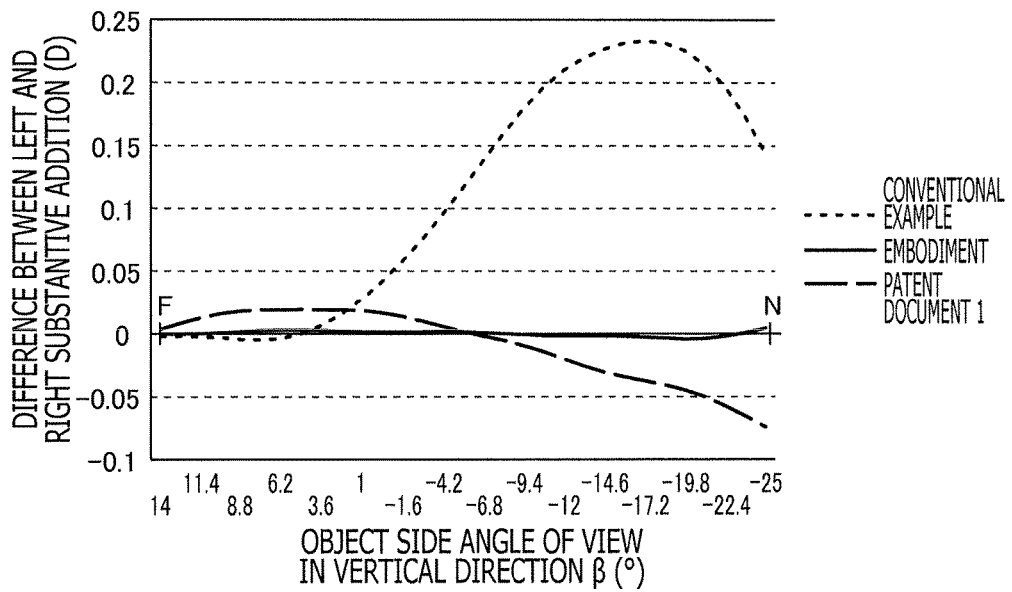
FIG. 11 is a diagram illustrating the difference between left and right substantive addition in each example.

FIG. 11 illustrates the relationship between the object side angle of view β (unit: degree) along the principal meridian LL' (in the vertical direction) and the difference (unit: D) of the left and right substantive additions. As shown in FIG. 4B, the object side angle of view β along the principal meridian LL' is based on the horizontal axis defined in the state of the front view. In FIG. 11, a solid line represents the difference between the left and right substantive additions according to the embodiment, a dashed line represents the difference between the left and right substantive additions in the patent document 1, and a dotted line represents the difference between the left and right substantive additions in the conventional example. As in the case of FIG. 9, the conventional example shown in FIG. 11 denotes a lens to which the technical concept where the transmission dioptric power distribution is enlarged or reduced in accordance with the difference between the left and right distance dioptric powers or the difference between the left and right substantive additions. As shown in FIG. 11, regarding the conventional example, the difference between the left and right substantive additions becomes large, for example, as the visual line is moved from the distance reference point F side to the near reference point N side. By contrast, regarding the patent document 1, the difference between the left and right substantive additions is suitably suppressed in the entire progressive zone. It is understood that, in this embodiment, the difference between the left and right substantive additions is almost zero over the entire progressive zone, and therefore is suppressed more suitably. That is, according to the spectacle lenses designed and manufactured according to the present design process, suitable binocular vision can be guaranteed at every object distance.

The foregoing is the explanation about the embodiment of the invention. Embodiments according to the invention are not limited to the above described examples, and various types of variations can be made within the scope of the technical concept of the invention. For example, embodiments may include examples and variations described herein by way of illustration or modifications thereof combined in an appropriate manner.

What is claimed is:

1. A pair of spectacle lenses, each of the pair of spectacle lenses comprising:
    a first refractive portion having a first refractive power;
    a second refractive portion having a second refractive power stronger than the first refractive power; and
    a progressive power portion in which a refractive power changes progressively from the first refractive portion to the second refractive portion,
    first refractive powers of a left and a right of the pair of spectacle lenses being different from each other,
    wherein lengths of progressive power portions in a vertical direction of the left and the right of the pair of spectacle lenses are different from each other and changing rates of additions of the left and the right of the pair of spectacle lenses are different from each other in accordance with a shift between left and right visual lines so that a difference between addition effects actually acting on left and right eyes of a wearer, on a principal meridian extending from the first refractive portion to the second refractive portion, is reduced when the left and right visual lines shift with respect to each other depending on a fact that the first refractive powers of the left and the right of the pair of spectacle lenses are different from each other in a state where the wearer views an object through the pair of spectacle lenses,
    one of the pair of spectacle lenses having the first refractive power weaker than that of an other of the pair of spectacle lenses is configured such that a changing rate of an addition becomes higher as a point becomes closer to the second refractive portion from a design center defined by a predetermined hidden mark on the principal meridian,
    the other of the pair of spectacle lenses having the first refractive power stronger than that of the one of the pair of spectacle lenses is configured such that a changing rate of an addition becomes lower as a point becomes closer to the second refractive portion from the design center on the principal meridian, and a difference between left and right substantive additions is almost zero over the entire progressive power portions along the vertical direction.

2. The pair of spectacle lenses according to claim 1, wherein:
   a length of the progressive power portion of one of the pair of spectacle lenses having the first refractive power weaker than that of an other of the pair of spectacle lenses is shorter than a length of the progressive power portion of the other of the pair of spectacle lenses; and
   a changing rate of an addition of the one of the pair of spectacle lenses having the first refractive power weaker than that of the other of the pair of spectacle lenses is higher than a changing rate of an addition of the other of the pair of spectacle lenses.

3. The pair of spectacle lenses according to claim 1, wherein widths of progressive power portions of the left and the right of the pair of spectacle lenses are different from each other.

4. A spectacle lens item group, each item in the spectacle lens item group comprising the pair of spectacle lenses according to claim 1,
   wherein, in every item of all items suitable for respective prescriptions in the spectacle lens item group, lengths of progressive power portions of a left and a right of the pair of spectacle lenses are different from each other, and changing rates of additions of the left and the right of the pair of spectacle lenses are different from each other.

* * * * *